United States Patent
Mangin

(10) Patent No.: US 10,652,044 B2
(45) Date of Patent: May 12, 2020

(54) ULTRA-LOW TRANSMISSION LATENCY FOR SPORADIC NETWORK TRAFFIC

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/093,383

(22) PCT Filed: Apr. 5, 2017

(86) PCT No.: PCT/JP2017/014886
§ 371 (c)(1),
(2) Date: Oct. 12, 2018

(87) PCT Pub. No.: WO2017/208633
PCT Pub. Date: Dec. 7, 2017

(65) Prior Publication Data
US 2019/0132149 A1 May 2, 2019

(30) Foreign Application Priority Data
Jun. 2, 2016 (EP) .................................. 16305643

(51) Int. Cl.
*H04L 12/40* (2006.01)
*H04L 12/913* (2013.01)
*H04L 12/851* (2013.01)
*H04L 12/931* (2013.01)

(52) U.S. Cl.
CPC ........ *H04L 12/40143* (2013.01); *H04L 47/24* (2013.01); *H04L 47/245* (2013.01); *H04L 47/724* (2013.01); *H04L 49/351* (2013.01)

(58) Field of Classification Search
CPC . H04L 12/40143; H04L 47/24; H04L 47/245; H04L 47/724; H04L 49/351
USPC .......................................................... 370/389
See application file for complete search history.

(56) References Cited

U.S. PATENT DOCUMENTS 6,226,263 B1    5/2001 Iwase et al.

FOREIGN PATENT DOCUMENTS

| EP | 2 650 779 A1 | 10/2013 |
|---|---|---|
| JP | 10-173662 A | 6/1998 |

OTHER PUBLICATIONS

Winkel et al., "Joint Tutorial IEEE 802.3br TF Interspersing express traffic (IET)", IEEE 802.1/IEEE 802.3 Tutorial #2, Berlin, Germany, Mar. 2015, pp. 1-61.
Korean Office Action, dated Jan. 6, 2020, for Korean Application No. 10-2018-7034140, with an English translation.

*Primary Examiner* — Natasha W Cosme
(74) *Attorney, Agent, or Firm* — Birch, Stewart, Kolasch & Birch, LLP

(57) ABSTRACT

The invention is related to a method for transmitting sporadic data stream (SStream) over a packet switched network carrying out further a transmission of priority data transmission within scheduled successive priority time windows. More particularly, the transmission of the sporadic data stream is preceded by a transmission of a reservation frame (RSVFrame) including information related at least to a timing for transmitting the sporadic data stream outside from said scheduled priority time windows.

17 Claims, 4 Drawing Sheets

ULTRA-LOW TRANSMISSION LATENCY FOR SPORADIC NETWORK TRAFFIC

TECHNICAL FIELD

The invention is related to data transmission of so-called "sporadic" streams (i.e. non-periodic and unpredictable stream) such as, for example, alarm data streams.

BACKGROUND ART

Packet-switched networks are increasingly used for industrial control application thanks to the introduction of Layer-2 features that allow the transport of control data that cannot suffer latency and transfer delay variation. For instance, low-latency sampling data, control (in closed loop) and image streaming (e.g. image processing) have very stringent latency requirements. Image streaming and associated processing as a part of a control loop has greater requirements than best effort transport could provide in a converged network.

In parallel, best effort stream is not time-critical, but provides a constant source of interference stream. Solutions have been progressively developed, in particular for the adaptation of switched Ethernet to the requirements of industrial field busses: EtherCAT, Ethernet Powerlink, TCnet, PROFINET, etc. All these solutions rely on specific additions to the standard Ethernet protocol that provide support for scheduled streams.

SUMMARY OF INVENTION

Technical Problem

The common scheme used by these adaptations is based on an organization of the transmission multiplex in time windows, each window being reserved for a specific stream. The number and repetition frequencies of the time windows are determined according to the requirements of the applications.

The usual current control applications generating scheduled stream have a periodic activity. The transmission multiplex end up is organized in periodic cycles as shown in the example of FIG. 1. Each cycle contains a series of time windows STW reserved for scheduled (low-latency) streams (scheduled frames SFR) and a series of time windows reserved for non-scheduled streams NSTW (dashed lines of FIG. 1).

To even further reduce potential sources of latency due to the interference between scheduled and non-scheduled streams, pre-emption mechanisms are also introduced. Pre-emption intervenes at the transition between a non-scheduled stream time window and a scheduled stream time window. In particular, upon such a transition, the beginning of a scheduled stream can be concurrent with the end of the transmission of a frame started during the prior non-scheduled stream time window. In such a case, the scheduled frame cannot be transmitted until the transmission of the current non-scheduled frame (referenced as NSFR in FIG. 2) ends.

By pre-empting the transmission opportunity of the residual part of the non-scheduled frame, it is possible to avoid additional delay to be suffered by the scheduled stream. To facilitate the pre-emption operation, the non-scheduled frame can be fragmented into several fragments f1, f2 (FIG. 3) causing the transmission of the remaining fragment(s) f2 to be delayed until the scheduled stream transmission is complete.

In an effort to provide a single standard for the support of a converged network capable of transporting all types of streams, the IEEE organization has defined two mechanisms:
  a scheduling scheme relying on the reservation of time windows for different types of streams (scheduled and non-scheduled) according to the standard IEEE-802.1Qbv;
  a pre-emption scheme that specify the fragmentation schemes of so called "normal" frames upon the concurrent transmission of so called "express" frames, according to standards IEEE-802.3br and 802.1bu.

802.1Qbv is based on a periodic calendar table, of which each entry defines a time window reserved for the transmission of a particular class of stream, e.g. scheduled or non-scheduled.

These standards provide then a complete framework for the transport of periodic scheduled streams with minimal latency that can provide similar services to those provided by the current standards cited above.

The transmission schedule of a scheduled stream has to be fixed all over the network. The exact times the frames are transmitted at by the "Talker" (a transmitting entity) and successively relayed at by the nodes along its path are centrally computed and set in each node by administration means. Such a configuration is static and only adapted for periodic scheduled streams.

Sporadic (i.e. non-periodic and unpredictable) low-latency streams cannot be handled by that kind of mechanisms. At best, they can take benefit of the pre-emption but will still suffer from variable latency. Alarms, for example, are typical sources of sporadic streams.

Solution to Problem

The present invention aims to improve the situation.

To that end, the present invention aims at a method for transmitting sporadic data stream over a packet switched network. That network is of the type of carrying out further a transmission of priority data transmission within scheduled successive priority time windows.

More particularly, the transmission of the sporadic data stream is preceded by a transmission of a reservation frame including information related at least to a timing for transmitting the sporadic data stream outside from said scheduled priority time windows.

The invention makes it thus possible to transmit sporadic streams by using pre-emption but without exposing them to delays due to interfering traffic encountered in the successive switching/multiplexing stages of a network.

Therefore, the invention proposes a mechanism that dynamically reserves a transmission window in transmitting entities such as the output ports of switches for the transmission of a sporadic stream. For this purpose, an in-band short signaling message (e.g. a "reservation" frame) is sent prior to the sporadic stream. The reservation frame follows the same path as the stream and is sent early enough to be able to timely trigger the opening of a transmission window in the output port of the switches it traverses. This transmission window is associated with a queue dedicated to the sporadic streams.

Therefore, in a particular embodiment, the transmission of the sporadic data stream follows a predetermined path over the network. That path can be defined by hops between transmitting entities of the network, from an emitting entity to a receiving entity. Therefore, upon reception of the aforesaid reservation frame by one of said transmitting entities, the transmitting entity checks whether said transmitting entity is available for transmitting said sporadic data stream according to said timing, and:

if yes, then said transmitting entity reserves time for transmitting said sporadic data stream according to said timing, and if not, then said transmitting entity sends back a message to the emitting entity comprising an information related to an unavailability of said transmitting entity for transmitting said sporadic data stream according to said timing, so as to discard the transmission of said sporadic data stream according to said timing.

The aforesaid "availability of said transmitting entity" can be determined upon checking whether a transmission of a previous sporadic data stream by said transmitting entity is already scheduled at said timing.

In a particular embodiment, the aforesaid message can simply correspond to said reservation frame being returned to the emitting entity with an indication of discard of the transmission of said sporadic data stream.

In an embodiment where:

the transmission of the sporadic data stream follows a predetermined path over the network, that path being defined by hops between transmitting entities of the network, from an emitting entity to a receiving entity, the priority data are configurable so as to enable a transmission of priority data frame fragment having a predetermined minimum size length, in an additional time window after one of said successive priority time windows, said fragment being preempted for transmission prior to said sporadic data frame, the aforesaid information included in the reservation frame and related to said timing can take into account a number of transmitting entities along said path being able to transmit one fragment of priority data in one additional window.

Therefore, the reservation frame programs the closing of the window associated with the normal streams at a time that guarantees that a frame fragment of the worst-case minimum size can still be transmitted before the opening of the window reserved for the sporadic stream. It is thus possible to forward the sporadic stream, as soon as it enters the switch, to the dedicated queue on its destination output port. This queue is served with no delay, eliminating the latency possibly due to the interfering normal traffic.

In a corresponding embodiment, the reservation frame can include thus information for reserving a time window for transmission of the sporadic data stream, by each transmitting entity of the path, and said emitting entity emits said reservation frame with an indication for starting and closing the time window for the transmission of the sporadic data stream for each transmission entity, at the respective times:

$t_{curr}$+delta and $t_{curr}$+delta+$T_{spor}$, where $t_{curr}$ is a current time, given by a common clock in the network, delta=(NBHop-1)*WCMFSD:

NBHop-1 being a variable number counting the remaining transmitting entities in the path before the receiving entity, WCMFSD being an estimated duration for sending a priority data fragment having a length corresponding to less than two of said predetermined minimum length, and $T_{spor}$ is the duration for the transmission of said sporadic data stream.

For example, the duration noted WCMFSD above can correspond to the estimated duration for sending a priority data fragment having a length corresponding to two of said predetermined minimum length, less one octet.

For example, the reservation frame can be transmitted from a transmitting entity to a next transmitting entity in the path, and each transmitting entity is capable of modifying the content of the reservation frame. Then, the number NBHop-1:

corresponds to the total number of transmitting entities in the path, in the reservation frame when leaving the emitting entity, and is decremented in the reservation frame by each transmitting entity receiving the reservation frame.

In a possible embodiment, the transmitting entities are switches of said network.

In a possible embodiment, the sporadic data are alarm data and/or data issued from one or several sensor(s).

In a possible application of the invention, the aforesaid network can be an industrial network (or an automotive network), involving thereby sensors or any other device being able to generate an alarm message for example, in a so-called "sporadic stream" (distinct from a usual telecommunication stream, which is often scheduled in a long term advance).

The present invention aims also at a system for transmitting sporadic data stream over a packet switched network, comprising an emitting entity and at least one transmitting entity. Each of said emitting entity and transmitting entity comprises a logical circuit for performing a method according to the invention as defined above.

Such a logical circuit can include a processor (PROC) cooperating with a memory (MEM) for storing and reading data of a computer program to perform the method of the invention, as well as a communication interface (COMINT) for writing and sending (on the emitting entity part) or receiving and reading (on a transmitting entity part) the reservation frames and upon the information included in it, performing the method of the invention. An example of such a, logical circuit is presented in FIG. 6 commented below (for a transmitting entity part, in particular).

The present invention aims also at such a transmitting entity of the system, comprising a logical circuit for interpreting the reservation frame and reserving a time window according to the content of the reservation frame, for the transmission of the sporadic data stream.

The present invention aims also at an emitting entity of the system, and comprising a logical circuit for emitting the reservation frame prior to the transmission of the sporadic data stream.

The invention aims also at a computer program product, comprising instructions for performing the method of the invention, when run by a processor.

The present invention is illustrated by way of example, and not by way of limitation, in the figures of the accompanying drawings, in which like reference numerals refer to similar elements.

DESCRIPTION OF EMBODIMENTS

Figure 1:
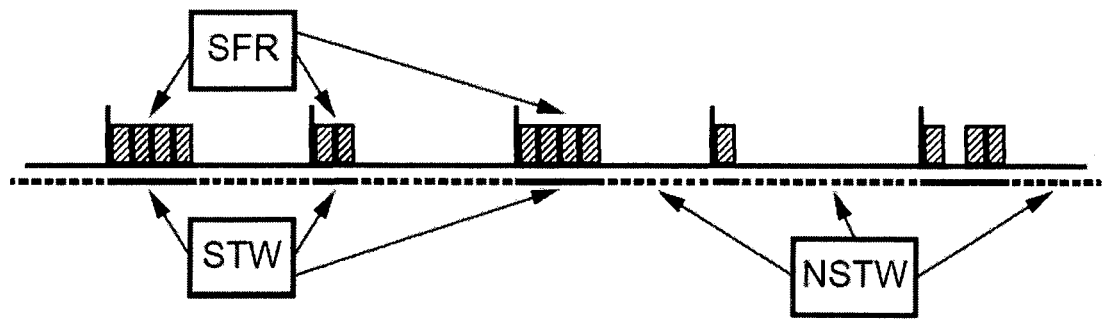
FIG. 1 shows schematically frames SFR scheduled for transmission in scheduled time windows STW according to known current IEEE standards.
Figure 2:
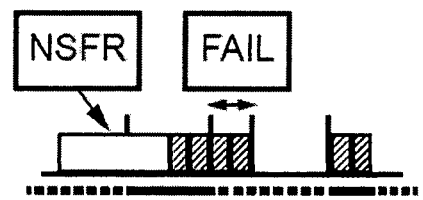
FIG. 2 shows a situation where non-scheduled frames may delay the transmission of scheduled frames.
Figure 3:
FIG. 3 shows a situation where frame fragments f1, f2 of non-scheduled frames are managed for transmission, so as to avoid the situation of FIG. 2, according to known current IEEE standards.
Figure 4:
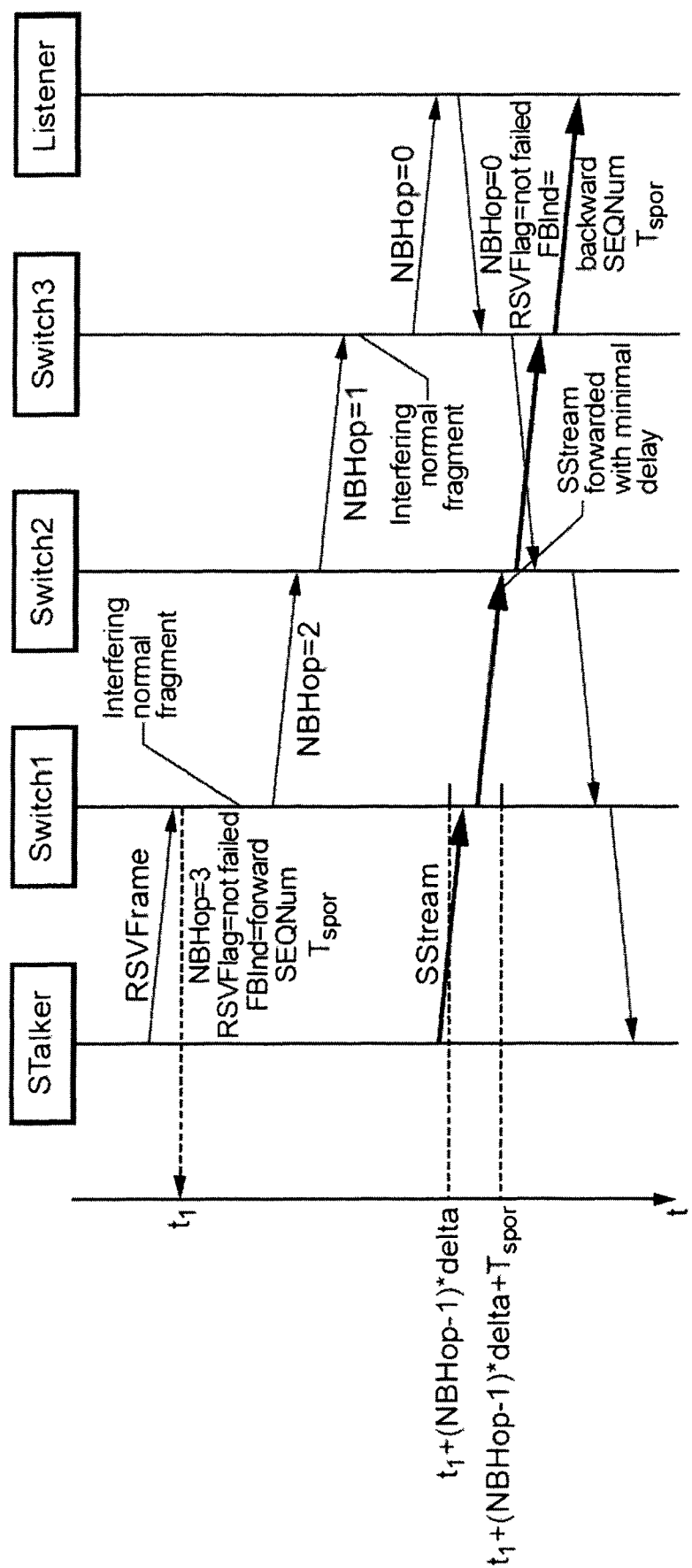
FIG. 4 shows a transmission scheme of a reservation frame preceding a sporadic stream transmission, according to the present invention, in a case where there is not any reservation already pending for sporadic stream transmission.
Figure 5:
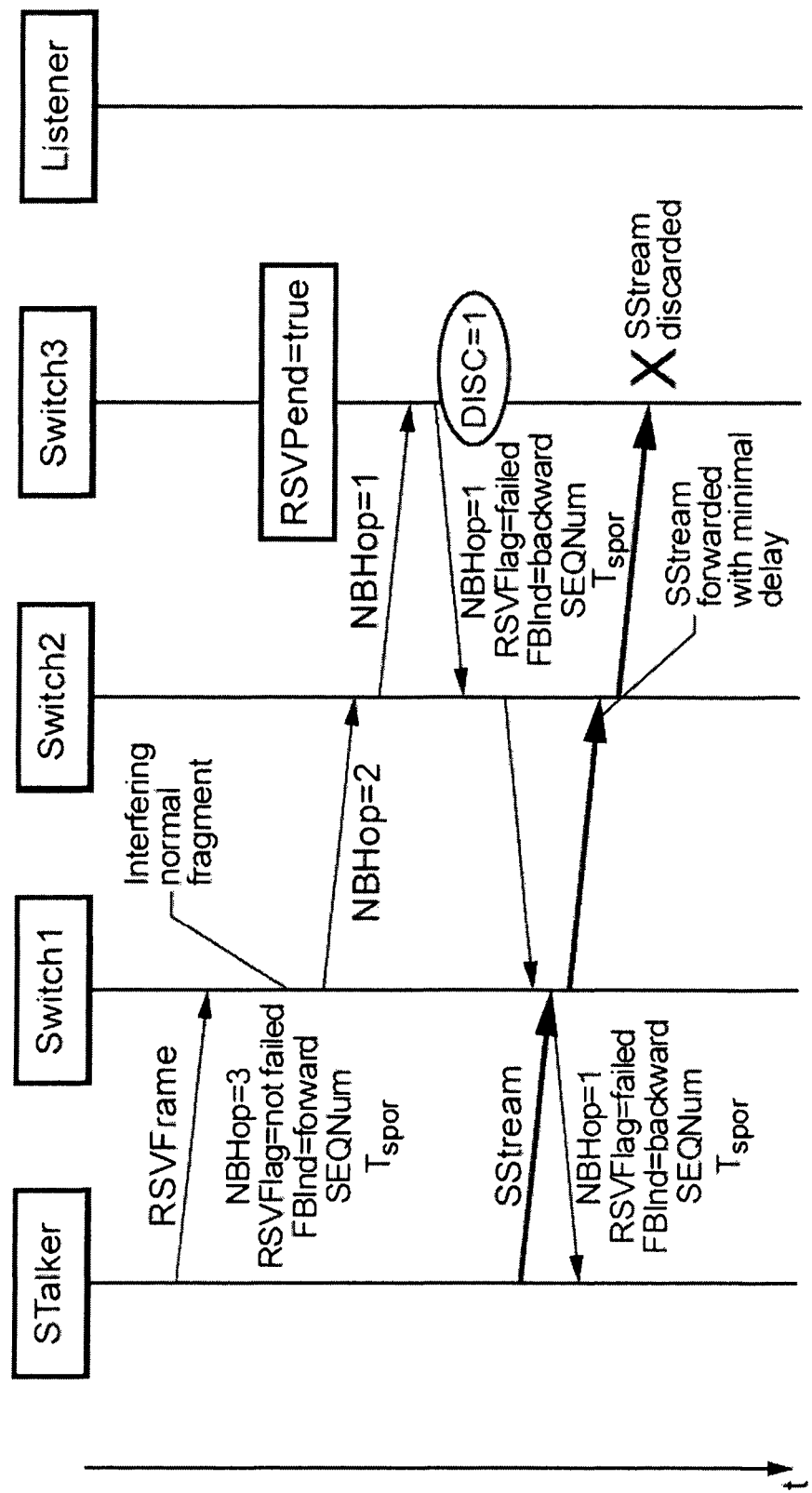
FIG. 5 shows a transmission scheme of a reservation frame preceding a sporadic stream transmission, according to the present invention, in a case where there is indeed a reservation already pending for sporadic stream transmission.

With reference to FIGS. 4 and 5, a Sporadic Talker (STalker) is an end-station that emits a sporadic stream.

The Sporadic Stream (SStream) is constituted of a finite (limited) number of frames exchanged at full link speed between the STalker and a Listener.

Only unicast SStreams are considered in the example.

SStreams are carried by bidirectional paths. The forward direction of a path goes from the STalker to the Listener, whereas the backward direction goes from the Listener to the STalker.

A Reservation Frame (RSVFrame) is a specific signaling frame that is forwarded on the exact same forward path as the SStream.

Cut-through forwarding is a frame forwarding scheme where the frames are forwarded without waiting for the validation of the integrity of each frame.

The worst-case minimum fragment size is the greatest size a frame fragment can have when the original frame is fragmented. For instance, in the case of a minimum fragment size of 64 bytes (determined by the usual standards), the worst-case minimum fragment is 127 bytes, which cannot be further divided into two minimum-size fragments.

The STalker has knowledge, for each S Stream it initiates, of the number of hops (NBHop=3 in the example of FIG. 4) the corresponding path contains.

The STalker has knowledge of the organization of the transmission time windows on each link belonging to the path to its Listeners. This information is stored in a calendar table associated with each possible Listener.

For the sake of simplification, all links in the network have the same capacity in the example (i.e. a maximum bitrate expressed in bit per second). A single clock/time reference is shared by all the nodes of the network.

Non-sporadic traffics and/or normal traffic can be pre-empted: their frames can be fragmented in case of the concurrent transmission of SStream frames on the same output port.

SStreams are marked with a specific traffic class identifier that makes it possible to identify them and apply specific processing in the nodes.

The protocol operation for a sporadic transmission by the STalker can be defined as follows.

The STalker determines the time intervals during which normal frames are transmitted.

Upon request from an application running on the STalker to transmit an SStream, the STalker immediately transmits a Reservation Frame (RSVFrame). The RSVFrame contains the following information:

A sequence number, incremented upon sending a new RSVFrame (SEQNum)

The number of hops on the path to the Listener (NBHop)

A reservation status flag (RSVFlag), set to "not failed"

A Forward/Backward (FBInd) indication, set to "forward"

The duration of the reservation, i.e. the duration of the SStream ($T_{spor}$)

The RSVFrame header contains the same forwarding information as the frames of the SStream to follow. This ensures that the RSVFrame follows the exact same path to the Listener as the stream's frames.

The time elapsed between the RSVFrame transmission and the actual SStream transmission is at least the time needed by the application to prepare the message to be transported by the stream and, ideally, a duration that equals the number of hops on the SStream's path multiplied by the transmission duration of a worst-case minimum fragment.

This later time interval guarantees that the SStream will not suffer any delay in the switches output ports when racing for transmission opportunity with normal traffic (as explained below relatively to the SStream forwarding). In such a configuration, the RSVFrame may be delayed by the transmission duration of a worst-case minimum size fragment each time it passes through a switch along the stream path, and still precedes the SStream's frames.

The STalker increments SEQNum upon each RSVFrame transmission.

All the frames constituting the SStream are sent in a single burst at the link speed.

Therefore, the durations for transmitting data hereafter are estimated according to the transmission rate over the network, of course.

The protocol operation for forwarding a sporadic stream by a switch can be defined as follows.

More particularly, the processing of a RSVFrame can be performed as follows, with reference to FIG. 6.

Upon reception (in step S1) of an RSVFrame with FBInd set to "forward", a network entity such as a switch SW forwards it to a Reservation Processing Unit (RSVProc).

Figure 6:
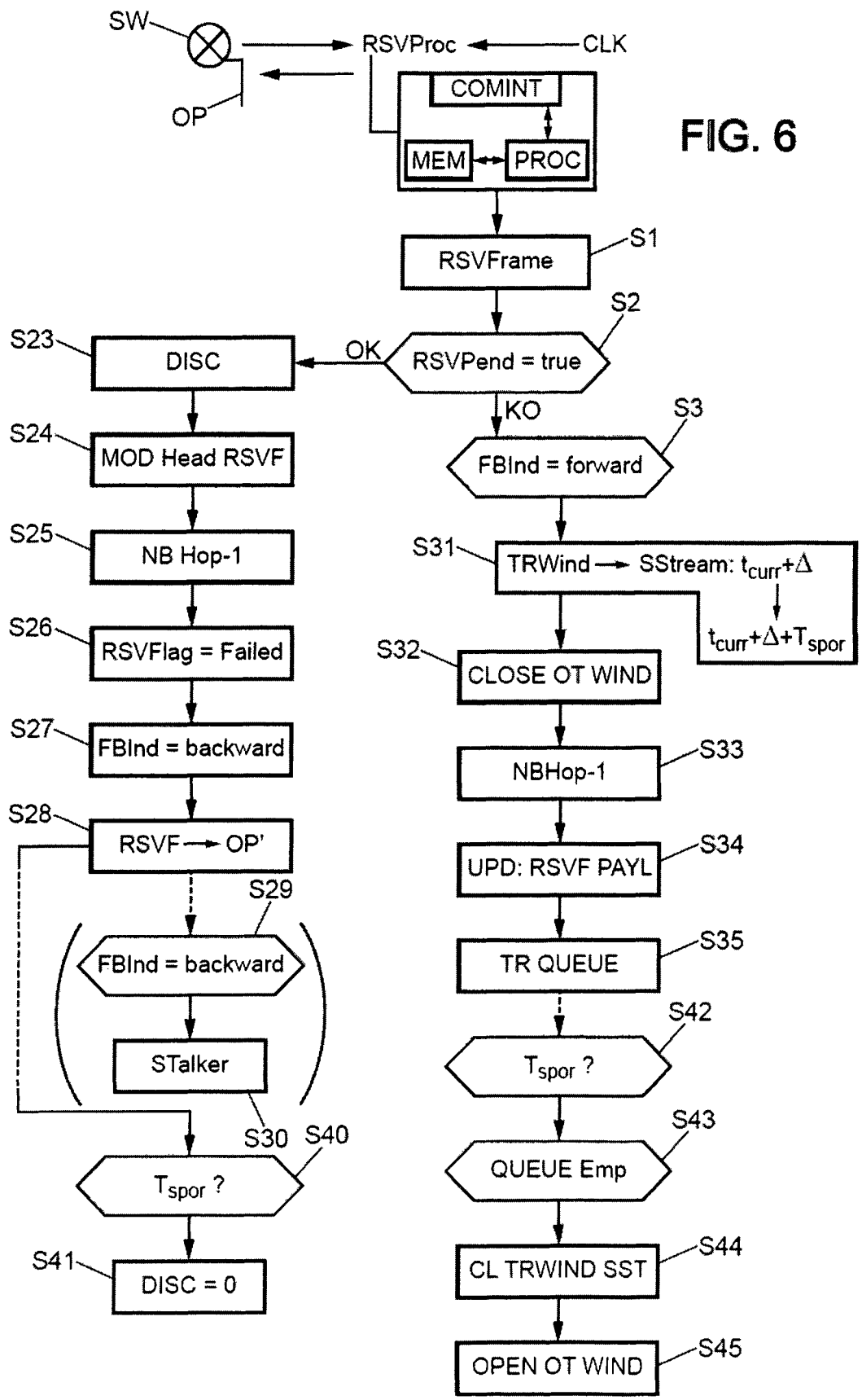
FIG. 6 shows a detailed flow chart of a method according to a possible example of embodiment of the invention.

The Reservation Processing Unit can include for example, as shown on FIG. 6:

a processor PROC, a working memory MEM (for storing for example instructions of the computer program according to the invention, as well as temporary data if needed, and notably the information received with RSVFrame that SStream is bound to be received so as to reserve a transmission duration $T_{spor}$ for sporadic stream transmission as presented below), and a communication interface COMINT so as to receive/send data, and is further connected to a clock CLK of the network. The Reservation Processing Unit can thus correspond to a device form performing the method of the invention.

The Reservation Processing Unit controls the output port OP addressed by the forwarding information contained in the header of the RSVFrame (received in step S1 of FIG. 6).

If reservation is already pending (RSVPend set to "true" in test S2 of FIG. 6), the RSVProc:

sets a discard indication (step S23) associated with the stream (DISC) that follows the RSVFrame modifies the forwarding information in the RSVFrame's header (step S24) so that it can be forwarded on the backward direction of the path decrements NBHop (step S25)

sets the RSVFlag to "failed" (step S26)

sets the FBInd flag to "backward" (step S27)

directs the RSVFrame to the switch's output port OP' addressed by the modified forwarding information (step S28), so that the RSVFrame can be sent back to the STalker (step S30) with the information of failure in the RSVFlag, as shown on FIG. 5.

In fact, if the FBInd is set to backward (step S29), the current switch relays RSVFrame to the output port addressed by the forwarding information contained in its header. The contents of the RSVFrame is not modified.

If no reservation is already pending as shown on FIG. 4, the RSVProc reads the RSVFrame contents and performs the following operations:

If the FBInd is set to "forward" (in test S3, opposing to step S27), the RSVProc performs the following operations:

programs a transmission window for the S Stream (step S31) using the gate control mechanism as per standard IEEE-802.1Qbv, that opens at $t_{curr}$+delta and closes at $t_{curr}$+delta+$T_{spor}$, where $t_{curr}$=current time delta=(NBHop−1)*WCMFSD, where WCMFSD is a worst case minimum fragment size duration (namely, for example, 127 octets=(2×64 octets−1), divided by the network rate which is assumed to be the same from a switch to another), and $T_{spor}$ is the duration of SStream closes the other transmission widow used for the normal traffics for the same time interval (step S32)

decrements NBHop (step S33) and update the RSVFrame's payload (step S34)

forwards the RSVFrame to the transmission queue reserved for SStreams (step S35) on the output port addressed by the forwarding information contained in the RSVFrame's header.

The protocol operation for processing the frames of the sporadic stream itself can be defined as follows.

If the DISC indication associated with the SStream is set, the frames of the SStream are discarded upon reception.

The DISC indication is then reset by the RSVProc (step S41) until duration $T_{spor}$ is elapsed (step S40).

If the DISC indication is not set, the SStream's frames are forwarded to the sporadic stream queue on the port addressed by the forwarding information contained in the frames' header. This queue is immediately served by the output port since the associated gate is opened as programmed by the RSVFrame.

Once $T_{spor}$ is elapsed (step S42) and the sporadic stream queue is empty (step S43), the RSVProc re-opens the window associated with the normal traffics (step S45) and removes the SStream window (step S44).

The Sporadic Stream transmission acknowledgement can be performed as follows.

Upon reception of an RSVFrame by the Listener, the latter can perform the following operations:

modifies the forwarding information in the RSVFrame's header so that it can be forwarded on the backward direction of the path sets the FBInd flag to "backward"

loops back the RSVFrame to its transmission port

The invention can be thus targeted at packet-switched networks capable of forwarding pre-emption. It is intended at providing ultra-low latency data transfer to time-critical applications that cannot be scheduled (unpredictable). Typically, it can be applied in embedded control networks such as industrial or automotive networks involving sporadic streams issued by alarms and/or measurements sensors for example.

More details about time window scheduling and traffic management mechanisms in IEEE 802.1 TSN networks can be found in documents EP-15305221 and EP-16305268 (EP patent application filing numbers).

The present invention can be embedded in a computer program product (an algorithm of which is described above with reference to FIG. 6), which comprises all the features enabling the implementation of the methods described herein, and which, when loaded in an information processing system (for example a user equipment or a network element), causes the information processing system to carry out the invention. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined below.

The invention claimed is:

1. A method for transmitting sporadic data stream over a packet switched network, said network carrying out further a transmission of priority data transmission within scheduled successive priority time windows, wherein the transmission of the sporadic data stream is preceded by a transmission of a reservation frame including information related at least to a timing for transmitting the sporadic data stream outside from said scheduled priority time windows, the reservation frame follows a predetermined path over the network that matches a predetermined path of the sporadic data stream to trigger an opening of a transmission window in at least one output port of transmitting entities in the path thereby dynamically reserving the transmission window for the sporadic data stream.

2. The method of claim 1, wherein the transmission of the sporadic data stream follows a predetermined path over the network, said path being defined by hops between transmitting entities of the network, from an emitting entity (Stalker) to a receiving entity (Listener), and wherein, upon reception of said reservation frame by one of said transmitting entities, said transmitting entity checks whether said transmitting entity is available for transmitting said sporadic data stream according to said timing.

3. The method of claim 2, wherein availability of said transmitting entity is determined upon checking whether a transmission of previous sporadic data stream by said transmitting entity is already scheduled at said timing.

4. The method according to claim 2, wherein said transmitting entities are switches of said network.

5. The method of claim 2, further comprising: upon determining that said transmitting entity is available for transmitting said sporadic data stream according to said timing, said transmitting entity reserves time for transmitting said sporadic data stream according to said timing.

6. The method of claim 2, further comprising: upon determining that said transmitting entity is unavailable for transmitting said sporadic data stream according to said timing, said transmitting entity sends back a message to the emitting entity including information related to an unavailability of said transmitting entity for transmitting said sporadic data stream according to said timing, so as to discard the transmission of said sporadic data stream according to said timing.

7. The method according to claim 6, wherein said message corresponds to said reservation frame being returned to the emitting entity with an indication of discard of the transmission of said sporadic data stream.

8. The method according to claim 1, wherein:

the transmission of the sporadic data stream follows a predetermined path over the network, said path being defined by hops between transmitting entities of the network, from an emitting entity (Stalker) to a receiving entity (Listener), said priority data are configurable so as to enable a transmission of priority data frame fragment having a predetermined minimum size length, in an additional time window after one of said successive priority time windows, said fragment being preempted for transmission prior to said sporadic data frame, and wherein said information included in the reservation frame and related to said timing takes into account a number of transmitting entities along said path being able to transmit one fragment of priority data in one additional window.

9. The method of claim 8, wherein said reservation frame includes information for reserving a time window for transmission of the sporadic data stream, by each transmitting entity of the path, and said emitting entity emits said reservation frame with an indication for starting and closing the time window for the transmission of the sporadic data stream for each transmitting entity, at the respective times: $t_{curr}$+delta and $t_{curr}$+delta+$T_{spor}$, where $t_{curr}$ is a current time, given by a common clock in the network, delta =(NBHop−1)*WCMFSD :

NBHop−1 being a variable number counting the remaining transmitting entities in the path before the receiving entity, WCMFSD being an estimated duration for sending a priority data fragment having a length corresponding to less than two of said predetermined minimum length, and $T_{spor}$ is the duration for the transmission of said sporadic data stream.

10. The method of claim 9, wherein duration WCMFSD corresponds to the estimated duration for sending a priority data fragment having a length corresponding to two of said predetermined minimum length, less one octet.

11. The method according to claim 9, wherein said reservation frame is transmitted from a transmitting entity to a next transmitting entity in the path, each transmitting entity being capable of modifying the content of the reservation frame, and wherein said number NBHop−1:

corresponds to the total number of transmitting entities in the path, in the reservation frame when leaving the emitting entity, and is decremented in the reservation frame by each transmitting entity receiving the reservation frame.

12. The method according to claim 1, wherein said sporadic data are alarm data and/or data issued from a sensor.

13. The method according to claim 1, wherein said network is an industrial network.

14. A system for transmitting sporadic data stream over a packet switched network, comprising an emitting entity and at least one transmitting entity, wherein each of said emitting entity and transmitting entity comprises a logical circuit for performing a method according to claim 1.

15. An emitting entity of a system according to claim 14, comprising a logical circuit for emitting said reservation frame prior to the transmission of sporadic data stream.

16. A transmitting entity of a system according to claim 14, comprising a logical circuit for interpreting said reservation frame and reserving a time window according to said reservation frame for the transmission of the sporadic data stream.

17. A computer program product comprising instructions for performing the method as claimed in claim 1, when run by a processor.

* * * * *